No. 896,955. PATENTED AUG. 25, 1908.
W. C. TRACY.
APPARATUS FOR TREATING ORES.
APPLICATION FILED MAR. 19, 1908.
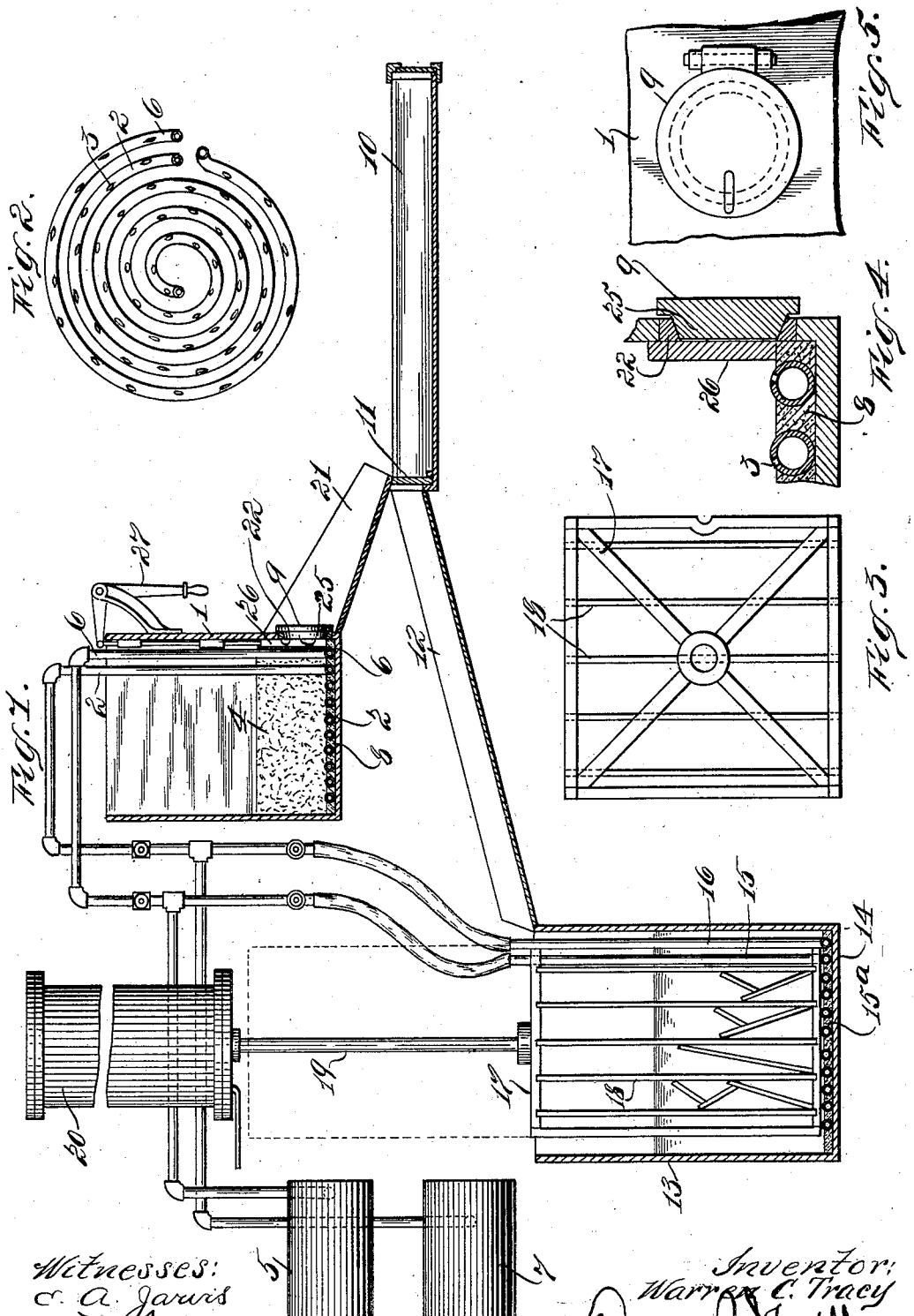

UNITED STATES PATENT OFFICE.

WARREN C. TRACY, OF DENVER, COLORADO.

APPARATUS FOR TREATING ORES.

No. 896,955.  Specification of Letters Patent.  Patented Aug. 25, 1908.

Application filed March 19, 1908. Serial No. 422,152.

*To all whom it may concern:*

Be it known that I, WARREN C. TRACY, a citizen of the United States, residing at Denver, Colorado, have invented certain new and useful Improvements in Apparatus for Treating Ores, of which the following is a clear, full, and exact description.

My invention relates to an apparatus for treating ores and is particularly useful in extracting copper from ores by a process of leaching the same and precipitating the copper from the solution. This process I do not claim herein as I have claimed the same in a co-pending application, Serial No. 420766 filed March 13 1908.

My invention will be set forth in the claims.

In the drawings which show the preferred form of my invention, Figure 1 is a view of my entire apparatus with the several tanks shown in section; Fig. 2 is a detached plan view of the coiled air and steam pipes; Fig. 3 is a top plan view of the cage used in the precipitating tank and showing several steel plates contained therein; Fig. 4 is an enlarged section through a portion of any cement bottom showing the pipes sunk therein and also of the exit door, and Fig. 5 is a front view of the exit door.

1 is a tank, preferably of wood, which has a bottom therein which is impervious to water, and is preferably formed of cement poured into the tank.

2 is a convoluted lead pipe, preferably coiled as shown, located at the bottom of the tank and provided with holes 3. These holes are preferably staggered and formed so that the jets of air passing out of the pipe will cross each other, as shown. Suitable means are provided for blowing air through the pipe so that the air will pass out of the holes and agitate the solution and pulverized ore 4 in the tank. Such means for blowing air may be of various construction, but for the purpose of illustration I have shown a compressed air tank 7 connected thereto. 6 is another lead pipe at the bottom of the tank which is similarly perforated and connected to a source of steam supply 5 for heating the solution.

In order to render the tank capable of being readily cleaned I have provided a bottom therefor which is impervious to water, preferably a cement bottom 8 formed by pouring cement into the tank and leveling the same off just below the holes in the top of the pipe 2. The cement obviously closely surrounds the pipes on all sides, except the perforated top.

9 is an exit door so that the solution may be drawn off through a wooden trough 21 to a wooden settling tank 10, together with the waste material at the bottom of tank 1. This exit door 9 is preferably formed as shown in Figs. 4 and 5. The opening of the tank is provided with a wooden bushing 22, and the door 9 is hinged at the outside of the tank at 24 and is provided with a conically shaped plug 25 to closely fit said bushing when the door is closed.

In Fig. 1 I have shown a wooden drop gate 26 slidably mounted in guides on the inside of the tank and operated by lever 27. This gate is for the purpose of relieving the pressure of the containing fluid on the outwardly opening door 9.

11 is an exit gate somewhat above the bottom of the tank 10 connected to a wooden trough 12 leading to a wooden precipitating tank 13. This precipitating tank has a bottom 14 and perforated air and steam pipes 15 and 16 respectively, the same as in tank 1.

The leaching solution is put into tank 1 and the crushed ore indicated at 4 then inserted and said ore leached for the required time, the solution being heated by the steam pipe and air being blown through the ore and solution to stir up the same. After the ore is suitably leached the solution is drawn off to the settling tank 10, and after the impurities have settled to the bottom the clear solution is drawn off to the precipitating tank 13.

In order to precipitate the copper from the solution I have provided a suitable cage 17 containing steel plates 18, which may be raised and lowered by a piston indicated by 19 in the cylinder 20 and which is operated by compressed air.

What I claim is:

1. In an apparatus for treating ores, a tank having therein a bottom impervious to water, a convoluted pipe in said tank sunk in said bottom and having a plurality of holes in its exposed surface, and means for blowing air through said pipe whereby the same passes from the pipe and out of said holes.

2. In an apparatus for treating ores, a tank having therein a bottom impervious to water, a convoluted pipe in said tank sunk in said bottom and having a plurality of holes in its exposed surface, and means for blowing air through said pipe whereby the same passes from the pipe and out of said holes, said holes being so formed as to direct air jets into the tank which cross each other.

3. In an apparatus for treating ores, a tank having therein a bottom impervious to water, a convoluted pipe in said tank sunk in said bottom and having a plurality of holes in its exposed surface, and means for blowing air through said pipe whereby the same passes from the pipe and out of said holes, said bottom being formed of cement closely surrounding said pipe on all sides except its top in which said holes are located.

4. In an apparatus for treating ores, a tank having therein a bottom impervious to water, a convoluted pipe in said tank sunk in said bottom and having a plurality of holes in its exposed surface, and means for blowing air through said pipe whereby the same passes from the pipe and out of said holes, and an exit gate for drawing off a fluid contained in said tank.

5. In an apparatus for treating ores, a tank having therein a bottom impervious to water, a convoluted pipe in said tank sunk in said bottom and having a plurality of holes in its exposed surface, another perforated pipe sunk in said bottom, means for blowing air through said first pipe and steam through said second pipe whereby the same passes from the pipes and out of said holes.

6. In an apparatus for treating ores, a tank having therein a bottom impervious to water, a convoluted pipe in said tank sunk in said bottom and having a plurality of holes in its exposed surface, another perforated pipe sunk in said bottom, means for blowing air through said first pipe and steam through said second pipe whereby the same passes from the pipe and out of said holes, said tank having an exit leading to a precipitating tank, an exit from said precipitating tank, said precipitating tank being provided at its bottom with means for heating said tank, and means for blowing air through a solution contained thereon, and one or more steel plates in said precipitating tank and mounted so as to be readily removable therefrom.

Signed at New York, N. Y. this 14th day of March 1908.

WARREN C. TRACY.

Witnesses:
EMERSON R. NEWELL,
WILLIAM H. TRACY.